United States Patent
Pitonyak et al.

(10) Patent No.: US 7,021,397 B2
(45) Date of Patent: Apr. 4, 2006

(54) FOLDING FURROW ROLLER FOR THE PREPARATION OF SEED BEDS

(75) Inventors: Thomas Edward Pitonyak, Carlisle, AR (US); Edward Oliver Brandi, Batesville, AR (US)

(73) Assignee: Pitonyak Machinery Corporation, Carlisle, AR (US)

( * ) Notice: Subject to any disclaimer, the term of this patent is extended or adjusted under 35 U.S.C. 154(b) by 0 days.

(21) Appl. No.: 10/775,401

(22) Filed: Feb. 10, 2004

(65) Prior Publication Data

US 2005/0028994 A1    Feb. 10, 2005

Related U.S. Application Data

(60) Provisional application No. 60/492,548, filed on Aug. 6, 2003.

(51) Int. Cl.
*A01B 73/04* (2006.01)

(52) U.S. Cl. .................. 172/662; 172/311; 172/459

(58) Field of Classification Search ............... 172/310, 172/311, 446, 456, 459, 662; 56/14.7–16.3, 56/377, 378, 384
See application file for complete search history.

(56) References Cited

U.S. PATENT DOCUMENTS

| | | | | |
|---|---|---|---|---|
| 4,023,623 A | * | 5/1977 | Anderson ................... 172/311 |
| 4,030,551 A | * | 6/1977 | Boetto et al. ............... 172/126 |
| 4,046,203 A | * | 9/1977 | Ward .......................... 172/456 |
| 4,126,189 A | * | 11/1978 | Channel ..................... 172/456 |
| 4,151,886 A | * | 5/1979 | Boetto et al. ............... 172/311 |
| 4,399,875 A | | 8/1983 | Schaaf |
| 4,479,549 A | | 10/1984 | Fegley |
| 4,561,504 A | | 12/1985 | Andersen |
| 4,813,489 A | | 3/1989 | Just |
| 4,878,545 A | * | 11/1989 | Dyken ........................ 172/776 |
| 4,923,017 A | * | 5/1990 | Meek et al. ................ 172/776 |
| 5,715,893 A | | 2/1998 | Houck |
| 6,119,792 A | | 9/2000 | Almer |
| 6,213,219 B1 | * | 4/2001 | Mosdal et al. .............. 172/311 |
| 6,382,327 B1 | * | 5/2002 | Mosdal ....................... 172/311 |
| 6,408,950 B1 | * | 6/2002 | Shoup ........................ 172/311 |
| 6,675,907 B1 | * | 1/2004 | Moser et al. ............... 172/311 |
| 6,761,228 B1 | * | 7/2004 | Dobson et al. ............. 172/311 |
| 2001/0001421 A1 | * | 5/2001 | Friggstad ................... 172/311 |
| 2001/0001988 A1 | * | 5/2001 | Friggstad ................... 172/310 |

* cited by examiner

*Primary Examiner*—Thomas B. Will
*Assistant Examiner*—Alexandra Pechhold
(74) *Attorney, Agent, or Firm*—Baker Botts L.L.P.

(57) ABSTRACT

A folding furrow roller that facilitates planting operations and optimization of irrigation and drainage with efficient preparation, configuration, and planting of seed beds. A centrally located fixed drum roller supports a pair of hinged outboard drum roller wings that for maximum implement width are deployed in alignment with the main section during operation. The wings are hydraulically folded into a compact upright position for legal transport over public roads. The implement is constructed so as to provide strength and durability comparable to single-section furrow rollers.

29 Claims, 8 Drawing Sheets

FOLDING FURROW ROLLER FOR THE PREPARATION OF SEED BEDS

This invention claims priority from provisional application 60/492,548 filed Aug. 6, 2003.

BACKGROUND

1. Field of the Present Invention

The present invention generally relates to the field of agricultural implements used for field preparation and configuration, and more particularly to an improved folding furrow roller for seed bed preparation, configuration, and planting that may be selectively deployed between an extended state for seed bed preparation, configuration, and planting and a folded state for storage and legal transport over public roads.

2. History of Related Art

Agricultural implements for preparing fields and configuring seed beds are well known in the art. Many of these agricultural implements employ earth working tools which are mounted on horizontally disposed frames to permit the implements to work wide swaths of earth. One example of such an implement is a furrow roller which utilizes plowshares and heavy rollers connected to the frames to prepare and configure seed beds. As the furrow roller is drawn through the field, the plowshares dig irrigation furrows that produce raised earthen mounds between the furrows, and the rollers smooth and compact these raised earthen mounds so as to create uniform raised seed beds separated by uniform irrigation furrows.

Working as wide a swath of earth as possible reduces the number of passes by the implement and the overall field preparation and configuration time. Consequently, the overall width of many of the agricultural implements has increased over time. The increased width, however, makes transport along public roads and highways difficult. In order to facilitate the transport and storage of these implements, the implement frames typically have been designed to utilize a main frame having one or more wing frames or members. These wing frames are typically connected to laterally opposite sides of the main frame so that the wing frames may be raised from positions that are substantially coplanar with the main frame (extended-working positions) to positions wherein the wing frames generally overlie or are generally perpendicular to the main frame (folded-transport or storage positions).

While the utilization of wing frames facilitates both objectives of working wide swaths of earth and transporting the implement along public roads and highways, the increased width of the implement while in the extended-working position together with the weight of the applicable earth working tools imposes significant axial and torsional forces that negatively impact the operational functionality of the implement. Accordingly, it would be beneficial to have an implement with wing frames that can support the applicable earth working tools and also manage the axial and torsional forces that are encountered when the wing frames are in the extended-working position.

BRIEF DESCRIPTION OF THE DRAWINGS

The structure and operation of the invention will become apparent upon reading the following detailed description and upon reference to the accompanying drawings in which.

Figure 1:
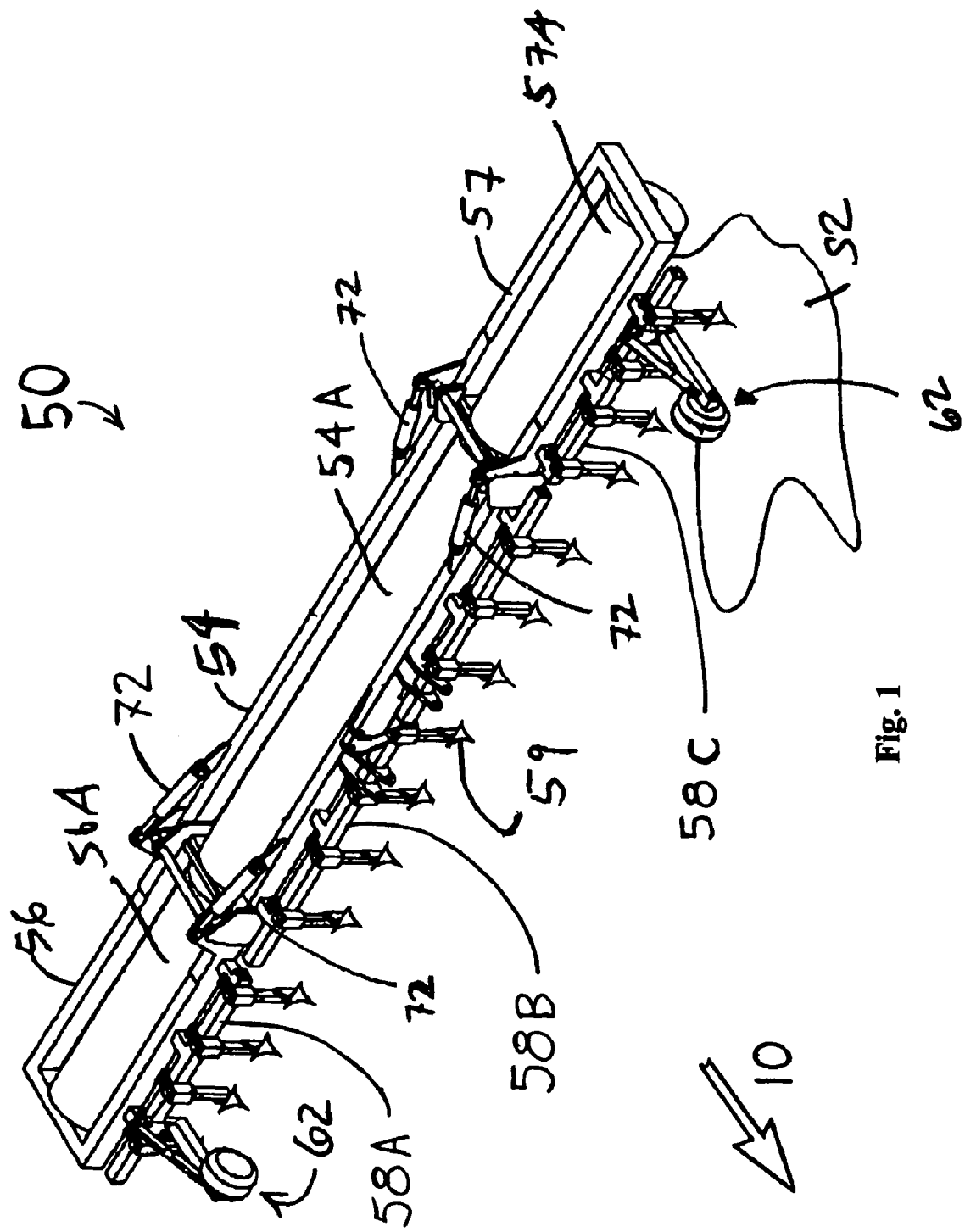
FIG. 1 is a top frontal isometric view of the preferred embodiment of the present invention depicting the plowshares and rollers with the foldable wing members deployed in the extended-working position for operation.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF THE INVENTION

Generally speaking, the present invention contemplates a folding furrow roller that has wing members that may be selectively deployed from a folded-transport or storage position to an extended-working position that increases the overall width of the furrow roller, and that is capable of managing the axial and torsional forces that are encountered when the wing members are in the extended-working position so as to permit the folding furrow roller to efficiently prepare, configure, and plant fields with the result being fields that have uniform furrows and elevated seed beds. Throughout the description and the drawings, elements which are the same will be accorded the same reference numerals.

FIG. 1 is a top frontal isometric view of the preferred embodiment of the present invention. Folding furrow roller 50 is designed to be towed by a suitable motorized vehicle, such as a farm tractor (not shown), over a field 52 for preparation and configuration for planting. Arrow 10 depicts the operational direction of folding furrow roller 50. Folding furrow roller 50 includes a rigid center frame member 54 and one or more outboard, foldable wing members 56 and 57 that may be selectively rotated between the extended-working position illustrated in FIG. 1 and a folded-transport or storage position illustrated in FIG. 3. In a preferred embodiment, folding furrow roller 50 includes both foldable wing members 56 and 57. Foldable wing members 56 and 57 may be selectively locked in either the extended-working position illustrated in FIG. 1 or the folded-transport or storage position illustrated in FIG. 3 for safety and stability. Center frame member 54 and foldable wing members 56 and 57 support and contain cylindrical rollers 54A, 56A, and 57A, respectively.

Folding wing members 56 and 57 are connected to center frame member 54 and controlled by arms 72. In one embodiment of the present invention, a pair of angularly inclined arms 72 are disposed on opposite top ends of both the front and rear of center frame member 54 and pivotally extend at an acute angle toward wing members 56 and 57. Each of arms 72 pivotally terminate on the front and rear edges of bordering ends of wing members 56 and 57, respectively, and are configured to manipulate wing members 56 and 57 between the extended-working position and the folded-transport or storage position. In a preferred embodiment of the present invention, arms 72 include hydraulic cylinders suitable for extending and folding wing members 56 and 57. Hydraulic cylinders of this type are commonly available from various manufacturers. One suitable model of such cylinders is a 4 inch by 8 inch hydraulic cylinder manufactured by Monarch Industries of Winnipeg, Canada.

Folding furrow roller 50 includes a plurality of downwardly projecting plowshares 59 that are moveably attached to rigid beams 58A, 58B, and 58C. Rigid beams 58B, 58A, and 58C are attached to the front of wing member 56, the front of center frame member 54, and the front of wing member 57, respectively. As folding furrow roller 50 is drawn about field 52, plowshares 59 engage the ground and dig irrigation furrows that produce raised earthen mounds between the furrows. Gauge wheel assemblies 62 are connected to rigid beams 58A and 58C and provide additional support for folding furrow roller 50 as it is towed through field 52.

The raised earthen mounds created by the soil pushed up from the furrows dug by plowshares 59 become the seed beds for the desired crops. Cylindrical rollers 54A, 56A, and 57A smooth and compact the seed beds in a uniform manner. Because cylindrical rollers 54A, 56A, and 57A are behind plowshares 59, the irrigation furrows and the seed beds are not only created concurrently, but the seed beds are also concurrently smoothed and compacted in a uniform manner when folding furrow roller 50 is towed about field 52.

Figure 2:
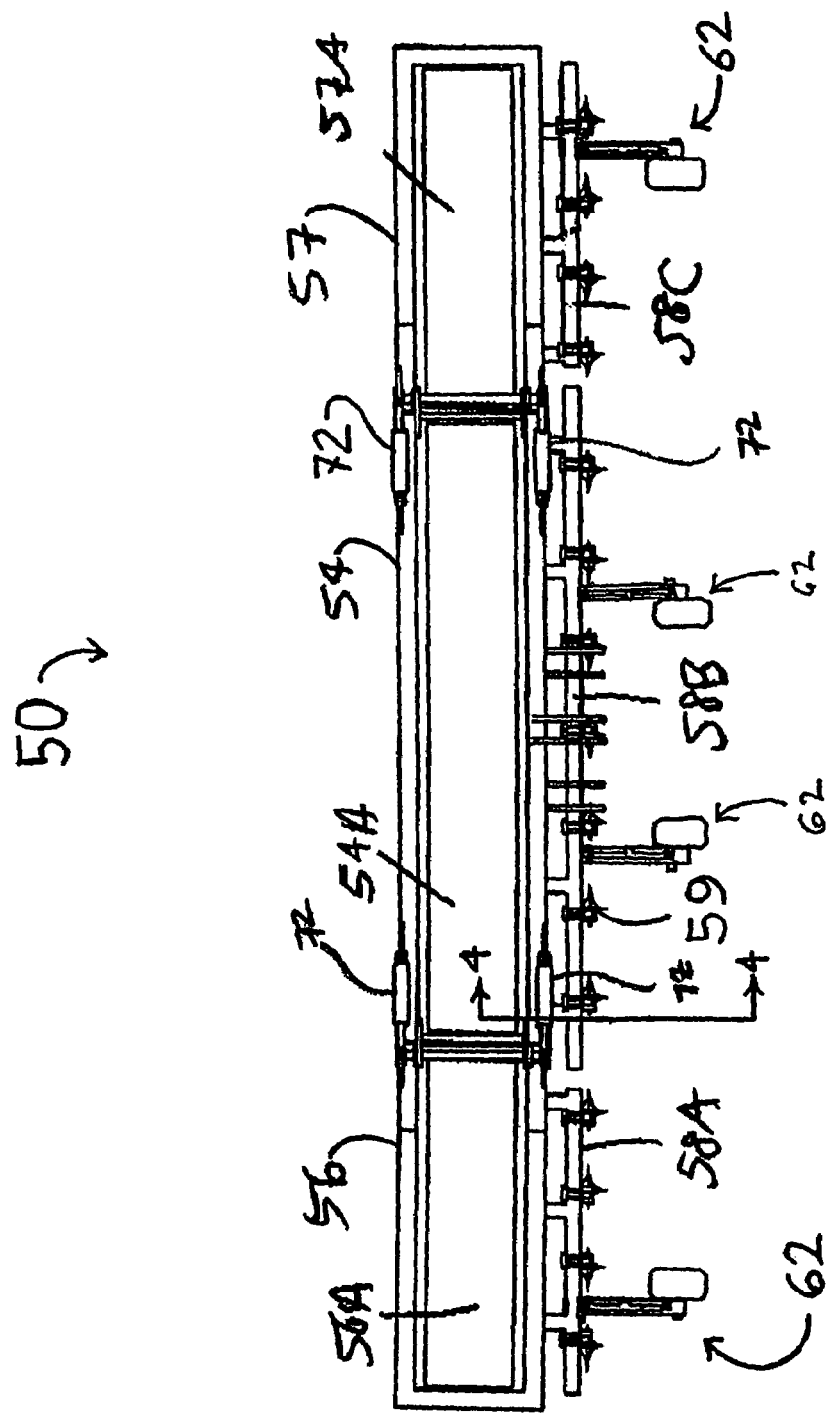
FIG. 2 is top plan view of the preferred embodiment of the present invention with the wing members deployed in the extended-working position for operation.

FIG. 2 is top plan view of the preferred embodiment of the present invention with wing members 56 and 57 deployed in the extended-working position for operation, and depicts each of the elements of folding furrow roller 50 shown in FIG. 1. Wing members 56 and 57 are not required to be the same length. Further, while center frame member 54 may be the same length as either of wing members 56 or 57, center frame member 54 is not required to be the same length as either of wing members 56 or 57. In a preferred embodiment of the present invention, wing members 56 and 57 are the same length and center frame member 54 is longer than wing members 56 and 57. In one embodiment of the present invention, wing members 56 and 57 are between 99 and 100 inches in length and center frame member 54 is 180 inches in length. In yet another embodiment of the present invention, wing members 56 and 57 are between 128 and 129 inches in length and center frame member 54 is between 228 and 229 inches in length.

Figure 3:
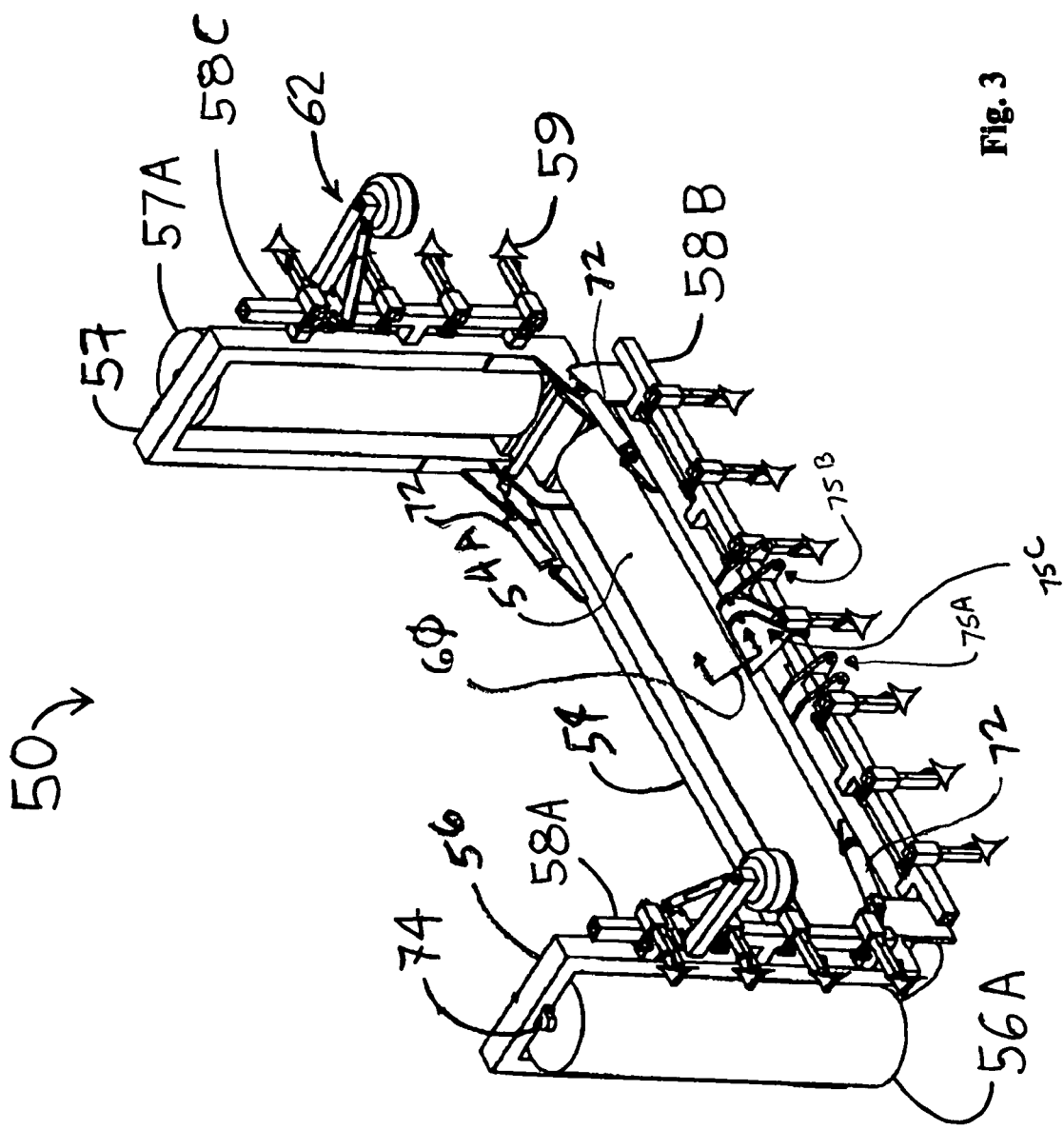
FIG. 3 is a top frontal isometric view of the preferred embodiment of the present invention with the wing members in the folded-transport or storage position used for storage and transport.

FIG. 3 is a top frontal isometric view of the preferred embodiment of the present invention with wing members 56 and 57 depicted in a folded-transport or storage position that may be used for transport and storage of folding furrow roller 50. FIG. 3 depicts each of the elements of folding furrow roller 50 shown in FIG. 1. In the preferred embodiment of folding furrow roller 50, center frame member 54 and wing members 56 and 57 are rigid rectangular welded tubular steel frames. In one embodiment of the preferred invention, the tubular steel frames from which center frame member 54 and wing members 56 and 57 are constructed are $^{5}/_{16}$ inch thick steel and have an outer dimension of 5 inches by 7 inches. It will be appreciated that cylindrical rollers 54A, 56A, and 57A may be constructed of any material such as steel or rugged plastic suitable for rolling over and uniformly compressing the applicable seed beds and connected to center frame member 54 and wing members 56 and 57 by way of stub shafts commonly known to those with ordinary skill in the relevant art. In one embodiment of the present invention, cylindrical rollers 54A, 56A, and 57A are constructed of steel pipe closed on the ends with welded steel discs. In the preferred embodiment of the present invention, concentrically through each of cylindrical rollers 54A, 56A, and 57A is an interior steel axle (not shown) having a diameter of 2.25 inches, both ends of which terminate in a pillow block 74, a bearing support commonly understood by those with ordinary skill in the relevant art. In an alternative embodiment, center frame member 54 and wing members 56 and 57 may contain two or more cylindrical rollers.

Hitch connectors 75A, 75B, and 75C include suitable pin holes and are connected to the front side of center frame member 54 and rigid beam 58B and permit folding furrow roller 50 to be connected by way of a standard three-point hitch, a connection device commonly known to those with ordinary skill in the farm implement industry, to a suitable motorized vehicle, such as a farm tractor (not shown). The typical distance from the pin hole of top hitch connector 75C to the center of cylindrical roller 54A (hereinafter, the "centerline measurement") is 50 inches or more. In a preferred embodiment of the present invention, the centerline measurement is less than 50 inches so as to substantially improve the ability of the applicable motorized towing device to lift folding furrow roller 50 and disengage folding furrow roller 50 from the ground particularly when wing members 56 and 57 are in a deployed extended-working position. In one embodiment of the present invention, the centerline measurement is 34 inches.

Figure 4:
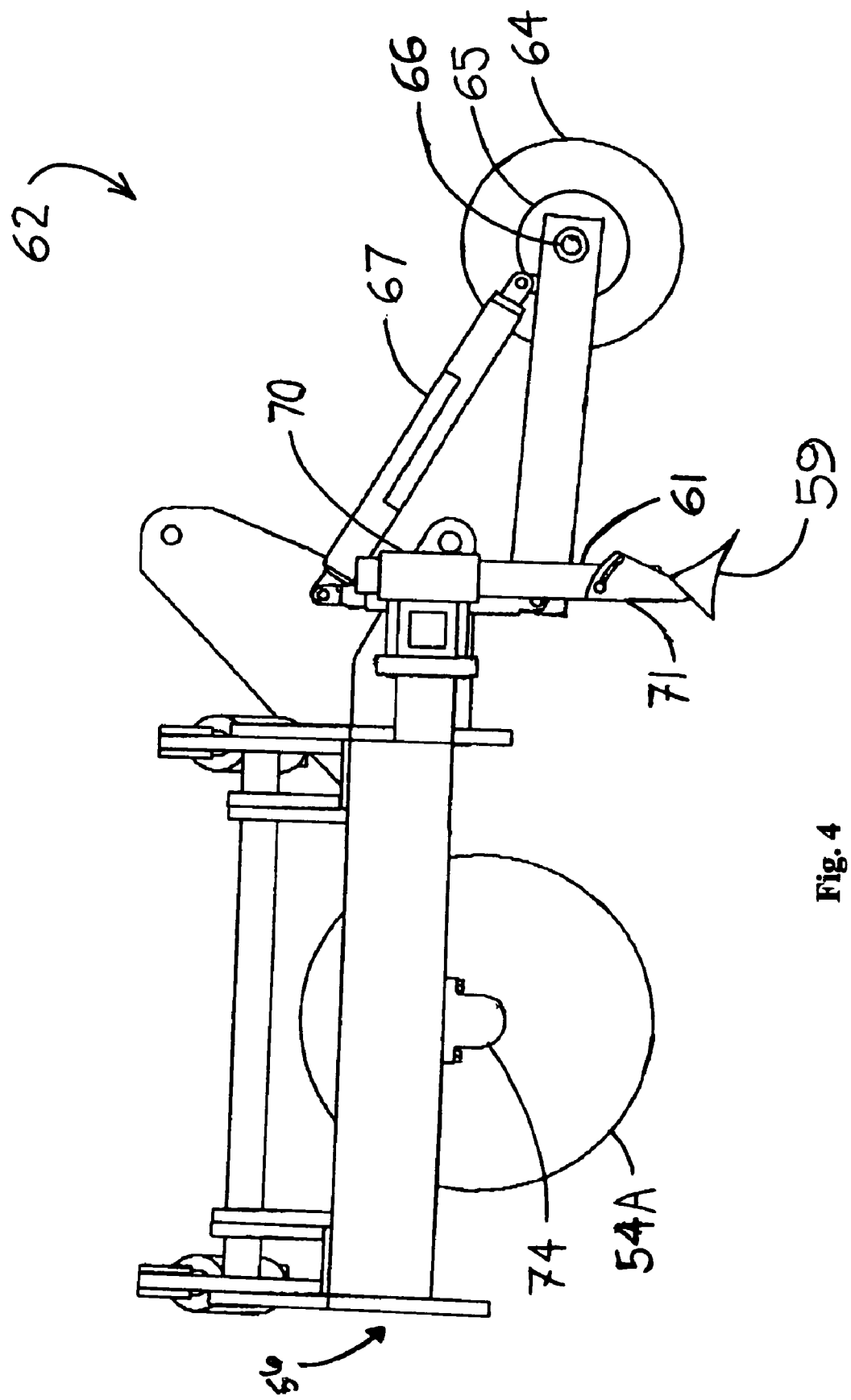
FIG. 4 is a sectional elevation view from FIG. 2 showing a gauge wheel assembly according to an embodiment of the present invention.

FIG. 4 is a sectional elevation view from FIG. 2 showing gauge wheel assembly 62 according to an embodiment of the present invention. In a preferred embodiment, additional support for folding furrow roller 50 is provided by a pair of gauge wheel assemblies 62 disposed substantially at each end of wing members 56 and 57. Adjusting means 61 permits variable vertical and angular positioning of each of plowshares 59. In a preferred embodiment of the present invention, adjusting means 61 includes a beam 62 vertically slideable in a fixed sleeve 70 and a plate 71 angularly moveable on slideable beam 62, both mechanisms commonly understood by those with ordinary skill in the relevant art. Gauge wheel assembly 62 may include a tire 64, wheel 65, and axle 66, and is attached to wing member 56 with commonly understood struts that may include adjustable linkages 67. In addition to support for wing members 56 and 57, in a preferred embodiment, gauge wheel assembly 62 provides, in cooperation with the three-point hitch connection, a means of affecting and gauging the vertical displacement of center frame member 54 and wing members 56 and 57 (and thereby, each of the corresponding cylindrical rollers—with cylindrical roller 56A and its corresponding pillow block 74 depicted here) when wing members 56 and 57 are parallel and locked to center frame member 54 in their deployed extended-working position. Although not shown, it should be apparent to those skilled in the art that one or more gauge wheel assemblies may also be connected to center frame member 54 so as to provide additional support for folding furrow roller 50. In another embodiment of the present invention, gauge wheel assemblies are disposed substantially at each end of center frame member 54.

Figure 5:
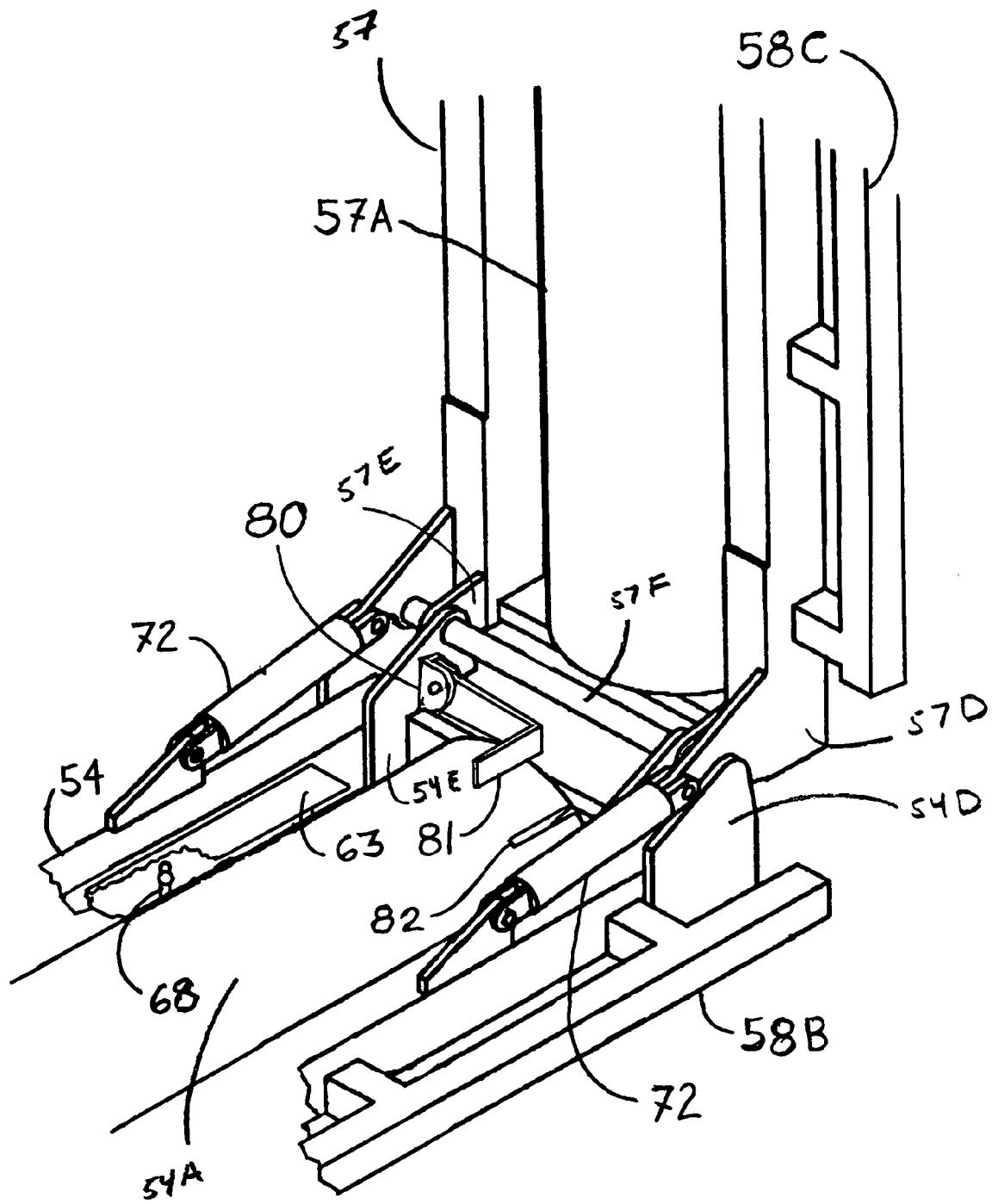
FIG. 5 is a partial isometric top view from FIG. 3 showing a roller lock and a scraper plate according to an embodiment of the present invention.

FIG. 5 is a partial isometric top view from FIG. 3. In a preferred embodiment of the present invention, scraper plate 63 is attached to center frame member 54 parallel and close enough to cylindrical roller 54A so as to perform a cleaning function. As cylindrical roller 54A rolls over the elevated seed beds created by plowshares 59 (FIG. 1), soil frequently accumulates on the outer surface of cylindrical roller 54A. Scraper plate 63 extends the entire length of cylindrical roller 54A and is bolted in place through one or more slots 68 in center frame member 54 so as to provide adjustability in the proximity of scraper plate 63 to cylindrical roller 54A, and thereby permit scraper plate 63 to be adjusted for a variety of soil adhesion conditions and to the optimum position for wiping soil or mud from cylindrical roller 54A while folding furrow roller 50 is towed through a field. In a preferred embodiment of the present invention, scraper plate 63 is constructed from 0.25 inch by 4.0 inch flat metal with a 0.5 inch by 1.5 inch hardened plow steel wear strip welded to the bottom of the flat metal. Although not shown, it should be apparent to those skilled in the art that the foregoing description with respect to scraper plate 63 may be applied to each of cylindrical rollers 56A and 57A as well as to cylindrical roller 54A.

At any convenient location, pivot mount 80 is attached so that L-shaped locking lug 81 may pivot and be capable of engaging a slot 82 in cylindrical roller 54A configured to receive L-shaped locking lug 81, and thereby, prevent rotation of cylindrical roller 54A. Pivot mount 80 is particularly useful when folding furrow roller 50 is in a folded-transport or storage position for storage or transport. Locking lug 81 may be pinned or cabled or otherwise configured so as to be prevented from engaging slot 82 during operation of folding furrow roller 50. In a preferred embodiment of the present invention, pivot mount 80 is attached to hinge plate 54E of center frame member 54. Although not shown, it should be apparent to those skilled in the art that the foregoing description with respect to pivot mount 80, locking lug 81, and slot 82 may be applied to each of wing members 56 and 57 and each of cylindrical rollers 56A and 57A as well as to center frame member 54 and cylindrical roller 54A.

Wing members 56 and 57 are pivotally connected to center frame member 54 by way of hinge plates or other suitable connection devices. In a preferred embodiment of the present invention, pair of hinge plates 54D and 54E are located on opposite top ends of center frame member 54 (on each of the front and rear edges of these top ends of center frame member 54), and wing member 57 has a pair of hinge plates 57D and 57E on the top end of wing member 57 located adjacent to center frame member 54 configured so as to pivotally connect to center frame member 54. Each pair of hinge plates 54D and 54E is configured to receive each corresponding pair of hinge plates 57D and 57E. In a preferred embodiment of the present invention, hinge plates 54D and 54E are on the outside edges of hinge plates 57D and 57E, respectively. Each pair of hinge plates 54D, 54E, 57D, and 57E are configured to be pivotally connected to one another using stub shafts or other suitable connection means well known to those with ordinary skill in the relevant art. In one embodiment of the present invention, each pair of hinge plates 54D, 54E, 57D, and 57E is pivotally connected to each other by way of hinge pin 57F which traverses the entire distance from hinge plate 54D on the front edge of center frame member 54 to hinge plate 54D on the rear edge of center frame member 54 so as to provide maximum resistance to axial and torsional forces that may be encountered by wing member 57. In a preferred embodiment of the present invention, hinge pin 57F is a solid steel shaft having a diameter of at least 2 inches. Also in a preferred embodiment of the present invention, arms 72 include hydraulic cylinders. With respect to the one of these hydraulic cylinders, one end is connected to hinge plate 57D on the front edge of wing member 57 and the other end is connected to the front edge of center member 54. With respect to another of these hydraulic cylinders, one end is connected to hinge plate 57D on the rear edge of wing member 57 and the other end is connected to the rear edge of center member 54. The connection of arms 72 to each of hinge plates 57D provides the improved benefit of allowing arms 72 to pull from points close to the pivot points of wing frame 57, and thereby, avoid the need for long connecting arms that are subject to torsional and potentially damaging bending forces. Although not shown, it should be apparent to those skilled in the art that the foregoing description with respect to the connection of wing member 57 to center frame member 54 and the connection of arms 72 to each of hinge plates 57D may be applied to the pivotal connection of wing member 56 to the opposite end of center frame member 54.

Figure 6:
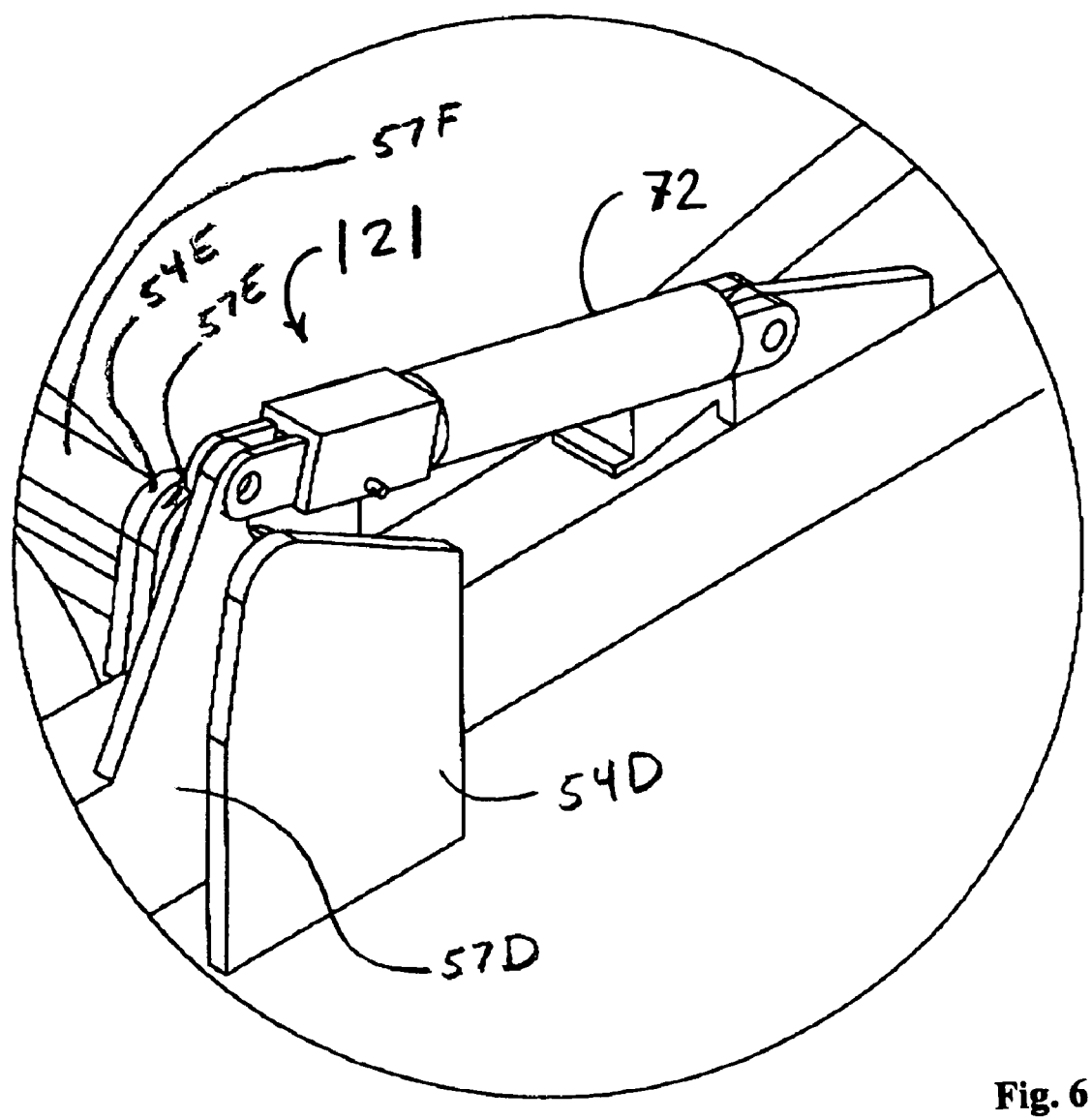
FIG. 6 is a partial enlarged isometric view of a cylinder and a cylinder lock according to an embodiment of the present invention.

FIG. 6 is a partial enlarged isometric view of arm 72 (which is depicted as hydraulic cylinder) connected to hinge plate 57D and a cylinder lock 121 according to an embodiment of the present invention. Cylinder lock 121 permits hydraulic cylinder 72 to be selectively locked after wing members 56 and 57 are rotated into their extended-working position or their folded-transport or storage position.

Figure 7:
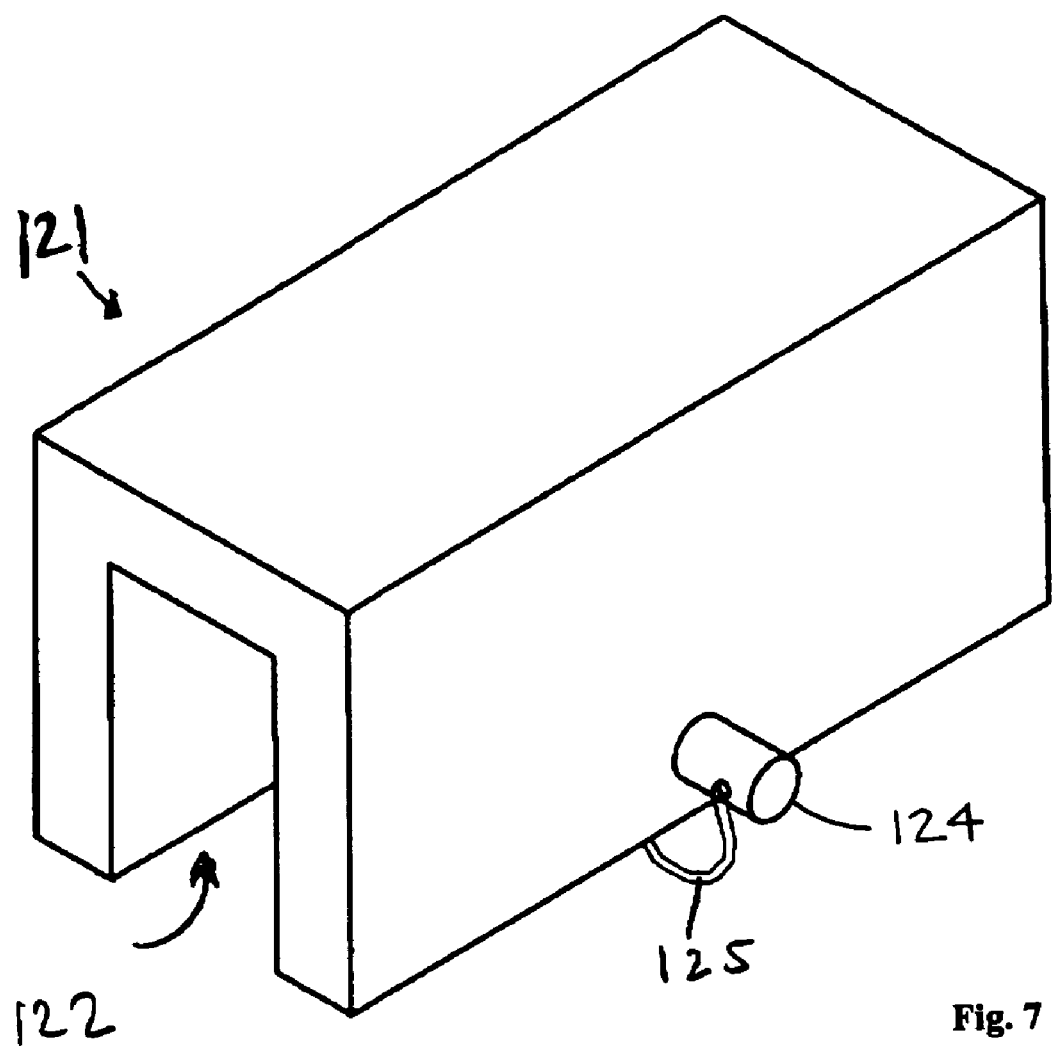
FIG. 7 is an isometric view of a cylinder lock from FIG. 6.

FIG. 7 is an isometric view of cylinder lock 121 from FIG. 6. Cylinder lock 121 is a U-shaped steel block having an open region 122 configured to receive an exposed ram of hydraulic cylinder 72 having a through-hole that lines up with a hole in each leg of the U-shaped-block of cylinder lock 121 so that a removable retainer pin 124, normally held by a retainer cable 125 which is connected to cylinder lock 121 penetrates, through the exposed ram of hydraulic cylinder 72 and the opposing legs of lock 121 to lock hydraulic cylinder 72 in the desired position. Cylinder lock 121 may be used to lock wing members 56 and 57 in a deployed extended-working position. Further, cylinder lock 121 may be configured to lock wing members 56 and 57 in a folded transport or storage position. When not in use, cylinder lock 121 may be pinned to any convenient member of folding furrow roller 50 capable of fitting in open region 122 and having a hole capable of receiving pin 124.

Figure 8:
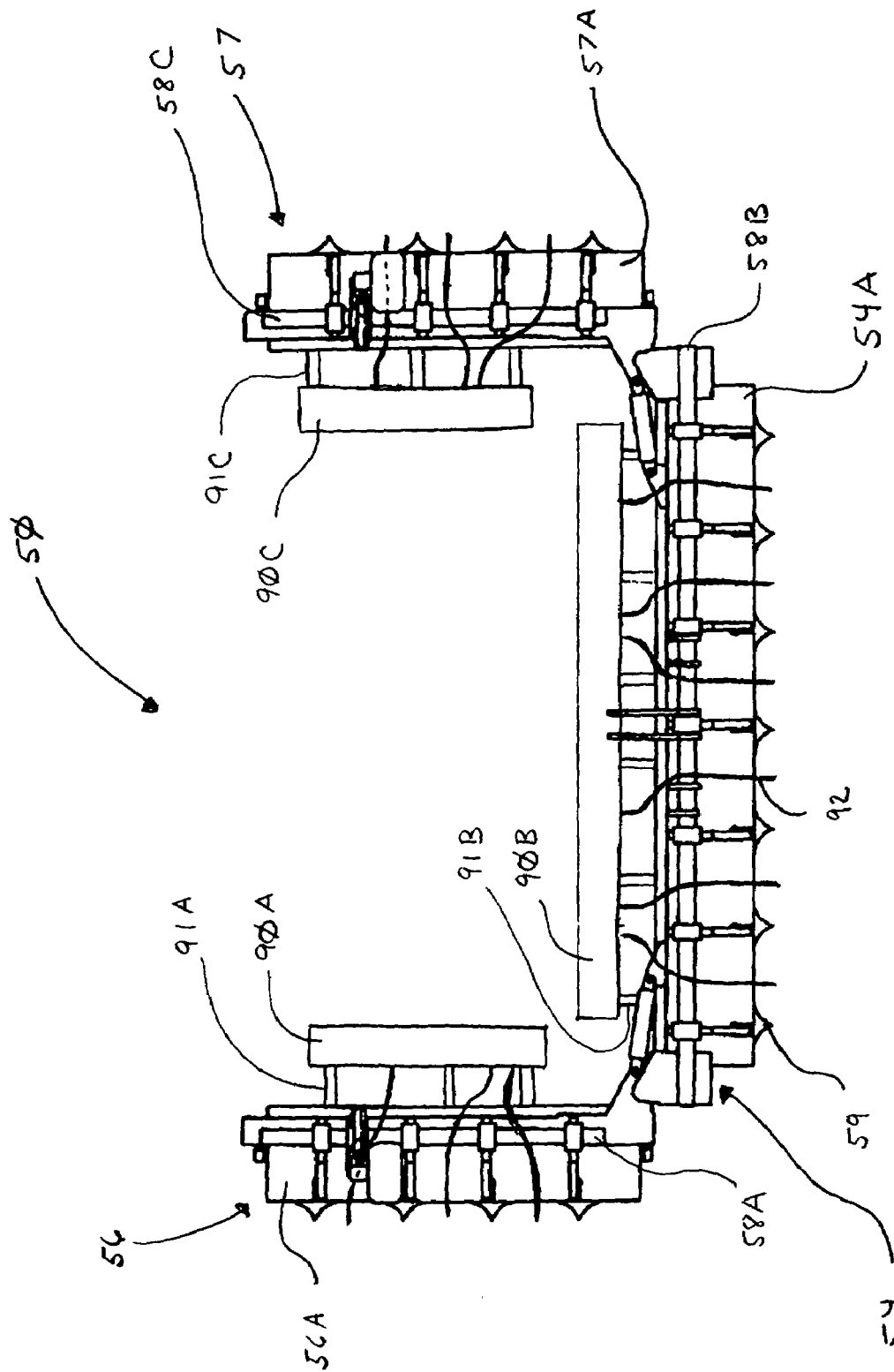
FIG. 8 is frontal view of an embodiment of the present invention showing a seeder and showing the wing members in the folded-transport or storage position used for storage and transport.

FIG. 8 is frontal view of an embodiment of the present invention with wing members 56 and 57 in the folded-transport or storage position. Seeder bins 90A, 90B, and 90C are selectively mounted above cylindrical rollers 54A, 56A, and 57A, respectively, by way of mounting arms 91A, 91B, and 91C, and are configured to hold seed. Feeder tubes 92 are connected to seeder bins 90A, 90B, and 90C, respectively, and configured for lateral adjustment so as to be centered between each of plow shares 59. In a preferred embodiment of the present invention, feeder tubes 92 are positioned so as to be substantially perpendicular to seeder bins 90A, 90B, and 90C and substantially parallel to each of plow shares 59. In one embodiment of the present invention, seeder bins 90A, 90B, and 90C are configured so as to distribute their respective weight (particularly when loaded with seed) evenly and directly over cylindrical rollers 54A, 56A, and 57A, and thereby aid with the smoothing and compaction of the seed beds. In another embodiment of the present invention seeder bins 90A, 90B, and 90C are configured to be connected to the rear of center frame member 54 and foldable wing members 56 and 57. In yet another embodiment of the present invention, a single seeder bin may be connected to the rear of furrow roller 50. As furrow roller 50 is drawn through the field, plowshares 59 dig irrigation furrows that produce raised earthen mounds between the furrows, seeds from seeder bins 90A, 90B, and 90C flow through feeder tubes 92 are deposited into the raised earthen mounds produced by plowshares 59, and cylindrical rollers 54A, 56A, and 57A smooth and compact these raised earthen mounds so as to create uniform, raised, and planted seed beds separated by uniform irrigation furrows concurrently in one operation.

It will be apparent to those with ordinary skill in the relevant art having the benefit of this disclosure that the present invention provides a foldable furrow roller with deployable wing members that is highly stabilized when deployed, but capable of easy reconfiguration for stable use, and for easy and legal transport. It is understood that the forms of the invention shown and described in the detailed description and the drawings are to be taken merely as presently preferred examples and that the invention is limited only by the language of the claims. While the present invention has been described in terms of one preferred embodiment and a few variations thereof, it will be apparent to those skilled in the art that form and detail modifications may be made to those embodiments without departing from the spirit or scope of the invention.

We claim:

1. An agricultural implement comprising:
    a substantially rectangular center frame member having a front edge, a rear edge, and two side edges;
    at least one substantially rectangular wing member, each wing member having a front edge, a rear edge, and two side edges;
    a plurality of center frame member hinge plates mounted on the center frame member, wherein at least one of the center frame member hinge plates is proximate to the front edge and the first of the side edges of the center frame member, and further wherein, at least one of the center frame member hinge plates is proximate to the rear edge and the first of the side edges of the center frame member;
    a plurality of wing member hinge plates mounted on each wing member, wherein at least one of the wing member hinge plates is proximate to the front edge and the first of the side edges of each wing member, and further wherein, at least one of the wing member hinge plates is proximate to the rear edge and the first of the side edges of each wing member, and further wherein the plurality of center frame member hinge plates are configured to be pivotally connected to the plurality of wing member hinge plates so as to permit any of the wing members to be connected to the first of the side edges of the center frame member, and further wherein, once connected, the wing member is capable of being rotated between a first extended-working position substantially parallel to and outboard of the first of the side edges of the center frame member and a second folded-transport or storage position substantially above and perpendicular to the first of the side edges of the center frame member;
    at least one hitch connector mounted to the agricultural implement and configured for connecting the agricultural implement to a suitable towing device;
    a hinge pin wherein each of the plurality of center frame member hinge plates and each of the plurality of wing member hinge plates are configured to receive the hinge pin, and further wherein the hinge pin traverses substantially the distance of the first of the side edges of the center frame member and connects each of the plurality of center frame member hinge plates and each of the plurality of wing member hinge plates mounted to the first of the side edges of the center frame member and to one of the side edges of the connected wing member, respectively; and
    a plurality of hydraulic cylinders for rotating a wing member connected to the first of the side edges of the center frame member wherein at least one of the hydraulic cylinders communicates between the front edge of the center frame member and the wing member hinge plate proximate to the front edge of the wing member, and further wherein at least one of the hydraulic cylinders communicates between the rear edge of the center frame member and the wing member hinge plate proximate to the rear edge of the wing member.

2. The agricultural implement of claim 1 wherein at least one of the hitch connectors is located no more than 86.4 centimeters (34 inches) from the agricultural implement's center of mass.

3. The agricultural implement of claim 1 wherein the plurality of center member hinge plates and the plurality of wing member hinge plates are configured so as to permit a connected wing member when in the second folded-transport or storage position to be substantially inboard of the first of the side edges of the center frame member.

4. The agricultural implement of claim 1 wherein the hinge pin is a solid steel rod having a diameter of at least 5.1 centimeters (2 inches).

5. The agricultural implement of claim 1 further comprising a plurality of cylinder locks wherein each cylinder lock is configured to selectively lock the connected wing member in the first extended-working position or the second folded-transport position.

6. The agricultural implement of claim 1 further comprising at least one gauge wheel assembly, each gauge wheel assembly having a wheel and an adjustable linkage, at least one of the gauge wheel assemblies moveably attached to a wing member connected to the first of the side edges of the center frame member, wherein when the attached wing member is in the first extended-working position, the wheels of the gauge wheel assemblies are in contact with a field over which the agricultural implement is moving, and further wherein the adjustable linkages are configured to maintain a consistent vertical displacement of the connected wing member and the center frame member to the field.

7. The agricultural implement of claim 6 wherein at least one of the gauge wheel assemblies is moveably attached to the center frame member.

8. The agricultural implement of claim 1 further comprising:
    a plurality of center frame member hinge plates mounted on the center frame member, wherein at least one of the center frame member hinge plates is proximate to the front edge and the second of the side edges of the center frame member, and further wherein, at least one of the center frame member hinge plates is proximate to the rear edge and the second of the side edges of the center frame member, so as to permit any of the wing members to be connected to the second of the side edges of the center frame member, and further wherein, once connected, the wing member is capable of being rotated between a first extended-working position substantially parallel to and outboard of the second of the side edges of the center frame member and a second folded-transport or storage position substantially above and perpendicular to the second of the side edges of the center frame member.

9. The agricultural implement of claim 8 wherein the plurality of center member hinge plates and the plurality of wing member hinge plates are configured so as to permit a connected wing member when in the second folded-transport or storage position to be substantially inboard of the second of the side edges of the center frame member.

10. The agricultural implement of claim 8 further comprising:
a hinge pin wherein each of the plurality of center frame member hinge plates and each of the plurality of wing member hinge plates are configured to receive the hinge pin, and further wherein the hinge pin traverses substantially the distance of the second of the side edges of the center frame member and connects each of the plurality of center frame member hinge plates and each of the plurality of wing member hinge plates mounted to the second of the side edges of the center frame member and to one of the side edges of the connected wing member, respectively.

11. The agricultural implement of claim 1 further comprising a plurality of plow beams moveably attached to the center frame member and to each of the plurality of wing members.

12. The agricultural implement of claim 11 further comprising a plurality of plowshares removeably attached to at least one of the plurality of plow beams.

13. The agricultural implement of claim 12 wherein the plowshares are configured to be vertically and angularly adjustable.

14. The agricultural implement of claim 1 further comprising:
at least one seeder bin; and
a plurality of feeder tubes connected to the seeder bins, wherein the feeder tubes are configured to be vertically and angularly adjustable.

15. An agricultural implement comprising:
a substantially rectangular center frame member having a front edge, a rear edge, and two side edges;
at least one substantially rectangular wing member, each wing member having a front edge, a rear edge, and two side edges;
a plurality of center frame member hinge plates mounted on the first of the side edges of the center frame member, wherein at least one of the center frame member hinge plates is proximate to the front edge of the center frame member, and further wherein, at least one of the center frame member hinge plates is proximate to the rear edge of the center frame member;
a plurality of wing member hinge plates mounted on one of the side edges of each wing member, wherein at least one of the wing member hinge plates is proximate to the front edge of each wing member, and further wherein, at least one of the wing member hinge plates is proximate to the rear edge of each wing member, and further wherein the plurality of center frame member hinge plates are configured to be pivotally connected to the plurality of wing member hinge plates so as to permit any of the wing members to be connected to the first of the side edges of the center frame member, and further wherein, once connected, the wing member is capable of being rotated between a first extended-working position substantially parallel to and outboard of the first of the side edges of the center frame member and a second folded-transport or storage position substantially above and perpendicular to the first of the side edges of the center frame member;
at least one hitch connector mounted to the agricultural implement and configured for connecting the agricultural implement to a suitable towing device; and
a plurality of hydraulic cylinders for rotating a wing member connected to the first of the side edges of the center frame member, wherein at least one of the hydraulic cylinders communicates between the front edge of the center frame member and the wing member hinge plate proximate to the front edge of the wing member, and further wherein at least one of the hydraulic cylinders communicates between the rear edge of the center frame member and the wing member hinge plate proximate to the rear edge of the wing member.

16. The agricultural implement of claim 15 further comprising a plurality of cylinder locks wherein each cylinder lock is configured to selectively lock the connected wing member in the first extended-working position or the second folded-transport position.

17. The agricultural implement of claim 15 further comprising:
a plurality of center frame member hinge plates mounted on the second of the side edges of the center frame member, wherein at least one of the center frame member hinge plates is proximate to the front edge of the center frame member, and further wherein, at least one of the center frame member hinge plates is proximate to the rear edge of the center frame member, so as to permit any of the wing members to be connected to the second of the side edges of the center member, and further wherein, once connected, the wing member is capable of being rotated between a first extended-working position substantially parallel to and outboard of the second of the side edges of the center frame member and a second folded-transport or storage position substantially above and perpendicular to the second of the side edges of the center frame member.

18. The agricultural implement of claim 17 wherein the plurality of center member hinge plates and the plurality of wing member hinge plates are configured so as to permit a connected wing member when in the second folded-transport or storage position to be substantially inboard of the second of the side edges of the center frame member.

19. The agricultural implement of claim 15 further comprising:
at least one seeder bin; and
a plurality of feeder tubes connected to the seeder bins, wherein the feeder tubes are configured to be vertically and angularly adjustable.

20. An agricultural implement comprising:
a substantially rectangular center frame member having a front edge, a rear edge, and two side edges;
at least one substantially rectangular wing member, each wing member having a front edge, a rear edge, and two side edges;
a plurality of center frame member hinge plates mounted on the first of the side edges of the center frame member, wherein at least one of the center frame member hinge plates is proximate to the front edge of the center frame member, and further wherein, at least one of the center frame member hinge plates is proximate to the rear edge of the center frame member;
a plurality of wing member hinge plates mounted on one of the side edges of each wing member, wherein at least one of the wing member hinge plates is proximate to the front edge of each wing member, and further wherein, at least one of the wing member hinge plates is proximate to the rear edge of each wing member, and further wherein the plurality of center frame member hinge plates are configured to be pivotally connected to the plurality of wing member hinge plates so as to permit any of the wing members to be connected to the first of the side edges of the center frame member, and further wherein, once connected, the wing member is capable of being rotated between a first extended-working position substantially parallel to and outboard of the first of the side edges of the center frame member and a second folded-transport or storage position substantially above and perpendicular to the first of the side edges of the center frame member;

at least one hitch connector mounted to the agricultural implement and configured for connecting the agricultural implement to a suitable towing device;

wherein the front edge, the rear edge, and the two side edges of the center frame member define a planar center frame member opening, and further wherein the front edge, the rear edge, and the two side edges of each of the wing members define a planar wing member opening;

at least one center frame member axle assembly rotateably attached to the side edges of the center frame member and spanning the center frame member opening; and at least one wing member axle assembly rotateably attached to the side edges of the wing members and spanning the wing member opening.

21. The agricultural implement of claim 20 further comprising:
at least one cylindrical roller concentrically mounted on at least one of the center frame member axle assemblies; and
at least one cylindrical roller concentrically mounted on at least one of the wing member axle assemblies.

22. The agricultural implement of claim 21 further comprising:
at least one seeder bin, wherein the seeder bins are selectively mounted above the cylindrical rollers; and
a plurality of feeder tubes connected to the seeder bins, wherein the feeder tubes are configured to be vertically and angularly adjustable.

23. The agricultural implement of claim 21 further comprising at least one scraper plate moveably attached to the agricultural implement, the scraper plates positioned in proximity to the cylindrical rollers so as to continually dislodge accumulations of soil from the cylindrical rollers as the cylindrical rollers rotate.

24. The agricultural implement of claim 23 wherein the scraper plates extend for at least part of the length of at least one of the cylindrical rollers; and further wherein each scraper plate is constructed from flat metal of at least 0.64 centimeters (0.25 inches) by 10.16 centimeters (4.0 inches) with a hardened steel wear strip of at least 1.27 centimeters (0.5 inches) by 3.81 centimeters (1.5 inches) connected to the bottom of the flat metal.

25. An agricultural implement comprising:
a substantially rectangular center frame member having a front edge, a rear edge, and two side edges, and wherein the front edge, the rear edge, and the two side edges of the center frame member define a planar center frame member opening;
at least one substantially rectangular wing member, each wing member having a front edge, a rear edge, and two side edges and wherein the front edge, the rear edge, and the two side edges of each of the wing members define a planar wing member opening;
a plurality of center frame member hinge plates mounted on the center frame member, wherein at least one of the center frame member hinge plates is proximate to the front edge and the first of the side edges of the center frame member, and further wherein, at least one of the center frame member hinge plates is proximate to the rear edge and the first of the side edges of the center frame member;
a plurality of wing member hinge plates mounted on each wing member, wherein at least one of the wing member hinge plates is proximate to the front edge and the first of the side edges of each wing member, and further wherein, at least one of the wing member hinge plates is proximate to the rear edge and the first of the side edges of each wing member, and further wherein the plurality of center frame member hinge plates are configured to be pivotally connected to the plurality of wing member hinge plates so as to permit any of the wing members to be connected to the first of the side edges of the center frame member, and further wherein, once connected, the wing member is capable of being rotated between a first extended-working position substantially parallel to and outboard of the first of the side edges of the center frame member and a second folded-transport or storage position substantially above and perpendicular to the first of the side edges of the center frame member;
at least one hitch connector mounted to the agricultural implement and configured for connecting the agricultural implement to a suitable towing device;
a hinge pin wherein each of the plurality of center frame member hinge plates and each of the plurality of wing member hinge plates are configured to receive the hinge pin, and further wherein the hinge pin traverses substantially the distance of the first of the side edges of the center frame member and connects each of the plurality of center frame member hinge plates and each of the plurality of wing member hinge plates mounted to the first of the side edges of the center frame member and to one of the side edges of the connected wing member, respectively;
at least one center frame member axle assembly rotateably attached to the side edges of the center frame member and spanning the center frame member opening; and
at least one wing member axle assembly rotateably attached to the side edges of the wing members and spanning the wing member opening.

26. The agricultural implement of claim 25 further comprising:
at least one cylindrical roller concentrically mounted on at least one of the center frame member axle assemblies; and
at least one cylindrical roller concentrically mounted on at least one of the wing member axle assemblies.

27. The agricultural implement of claim 26 further comprising:
at least one seeder bin, wherein the seeder bins are selectively mounted above the cylindrical rollers; and
a plurality of feeder tubes connected to the seeder bins, wherein the feeder tubes are configured to be vertically and angularly adjustable.

28. The agricultural implement of claim 26 further comprising at least one scraper plate moveably attached to the agricultural implement, the scraper plates positioned in proximity to the cylindrical rollers so as to continually dislodge accumulations of soil from the cylindrical rollers as the cylindrical rollers rotate.

29. The agricultural implement of claim 28 wherein the scraper plates extend for at least part of the length of at least one of the cylindrical rollers; and further wherein each scraper plate is constructed from flat metal of at least 0.64 centimeters (0.25 inches) by 10.16 centimeters (4.0 inches) with a hardened steel wear strip of at least 1.27 centimeters (0.5 inches) by 3.81 centimeters (1.5 inches) connected to the bottom of the flat metal.

* * * * *

UNITED STATES PATENT AND TRADEMARK OFFICE
CERTIFICATE OF CORRECTION

| | | |
|---|---|---|
| PATENT NO. | : 7,021,397 B2 | Page 1 of 1 |
| APPLICATION NO. | : 10/775401 | |
| DATED | : April 4, 2006 | |
| INVENTOR(S) | : Thomas Edward Pitonyak and Edward Oliver Brandt | |

It is certified that error appears in the above-identified patent and that said Letters Patent is hereby corrected as shown below:

On the title page: should read

Inventors: Thomas Edward Pitonyak, Carlisle, AR (US); Edward Oliver [[Brandi]] <u>Brandt</u>, Batesville, AR (US)

Signed and Sealed this

Seventeenth Day of April, 2007

JON W. DUDAS
*Director of the United States Patent and Trademark Office*